(12) United States Patent
Ramasamy et al.

(10) Patent No.: US 12,299,495 B2
(45) Date of Patent: May 13, 2025

(54) LEVERAGING DISTRIBUTED REGISTERS TO MONITOR, TRACK, AND RECOMMEND UTILIZATION OF RESOURCES

(71) Applicant: BANK OF AMERICA CORPORATION, Charlotte, NC (US)

(72) Inventors: Suki Ramasamy, Tamil Nadu (IN); Sudharsan Ramadurai, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 989 days.

(21) Appl. No.: 17/361,981

(22) Filed: Jun. 29, 2021

(65) Prior Publication Data
US 2022/0413929 A1    Dec. 29, 2022

(51) Int. Cl.
*G06F 9/50* (2006.01)
*G06F 11/34* (2006.01)

(52) U.S. Cl.
CPC .......... *G06F 9/5055* (2013.01); *G06F 9/5077* (2013.01); *G06F 11/3433* (2013.01); *G06F 2209/501* (2013.01); *G06F 2209/508* (2013.01)

(58) Field of Classification Search
CPC .. G06F 9/5055; G06F 9/5077; G06F 11/3433; G06F 2209/501
See application file for complete search history.

(56) References Cited

U.S. PATENT DOCUMENTS

| | | | |
|---|---|---|---|
| 5,963,910 A | 10/1999 | Ulwick | |
| 6,263,432 B1 | 7/2001 | Sasmazel et al. | |
| 6,556,974 B1 | 4/2003 | D'Alessandro | |
| 6,714,918 B2 | 3/2004 | Hillmer et al. | |
| 7,277,864 B2 | 10/2007 | Ohnemus et al. | |
| 9,297,723 B1 * | 3/2016 | Hofmann | G06N 20/00 |
| 9,400,731 B1 * | 7/2016 | Preece | G06F 11/3447 |
| 10,048,996 B1 * | 8/2018 | Bell | G06F 11/3006 |
| 10,291,627 B2 | 5/2019 | Gleichauf | |
| 10,747,606 B1 * | 8/2020 | Shemer | G06F 11/079 |
| 10,997,538 B1 * | 5/2021 | Chandrachood | G06Q 10/06312 |
| 10,997,664 B1 * | 5/2021 | McAlister | G06Q 40/08 |
| 11,427,207 B1 * | 8/2022 | Ethington | B60K 28/063 |
| 11,544,729 B2 | 1/2023 | Leekley et al. | |

(Continued)

FOREIGN PATENT DOCUMENTS

| | | |
|---|---|---|
| KR | 100995974 B1 | 11/2010 |
| KR | 1020150046522 A | 4/2015 |
| KR | 101865216 B1 | 6/2018 |

*Primary Examiner* — Benjamin C Wu
(74) *Attorney, Agent, or Firm* — Moore & Van Allen PLLC; Anoohya Yarlagadda

(57) ABSTRACT

Embodiments of the present invention provide a system for leveraging distributed register technology to securely monitoring, tracking, and recommending utilization of resources. The system is configured for gathering one or more input parameters from one or more entity systems, collecting activity data from one or more third party systems, analyzing the activity data collected from the one or third party systems, generating one or more recommendations based on the one or more input parameters and analyzing the activity data, wherein the one or more recommendations are associated with one or more activities, estimating resource usage for the one or more recommendations, and allocating resources to the one or more recommendations.

20 Claims, 6 Drawing Sheets

(56) References Cited

U.S. PATENT DOCUMENTS

| | | | |
|---|---|---|---|
| 11,797,856 B1* | 10/2023 | Oezer | G06N 3/092 |
| 11,829,274 B1* | 11/2023 | Ghosh | G06F 11/3024 |
| 2004/0039631 A1 | 2/2004 | Crockett et al. | |
| 2004/0220843 A1 | 11/2004 | Walter | |
| 2007/0011683 A1* | 1/2007 | Helander | G06F 9/50 |
| | | | 718/104 |
| 2008/0059257 A1 | 3/2008 | Farmer et al. | |
| 2009/0150316 A1 | 6/2009 | Peitersen et al. | |
| 2010/0249975 A1 | 9/2010 | Rezayat | |
| 2013/0198840 A1* | 8/2013 | Drissi | G06F 21/552 |
| | | | 726/22 |
| 2015/0256475 A1* | 9/2015 | Suman | H04L 47/83 |
| | | | 709/226 |
| 2016/0248798 A1* | 8/2016 | Cabrera | H04L 63/1433 |
| 2016/0379326 A1* | 12/2016 | Chan-Gove | H04L 63/107 |
| | | | 705/325 |
| 2017/0093657 A1* | 3/2017 | Angus | H04L 43/16 |
| 2018/0181979 A1 | 6/2018 | Frank et al. | |
| 2018/0285905 A1 | 10/2018 | Ko | |
| 2019/0213509 A1* | 7/2019 | Burleson | G06N 20/00 |
| 2020/0110655 A1* | 4/2020 | Harwood | G06F 11/079 |
| 2020/0162342 A1* | 5/2020 | Fattu | H04L 41/16 |
| 2020/0258147 A1 | 8/2020 | Song et al. | |
| 2020/0293361 A1* | 9/2020 | Falk | G06F 9/466 |
| 2021/0217510 A1* | 7/2021 | Chakra | G01C 21/3697 |
| 2021/0357925 A1 | 11/2021 | Flurscheim et al. | |
| 2022/0004477 A1* | 1/2022 | Dahl | G06F 11/302 |
| 2022/0019461 A1* | 1/2022 | Balle | G06F 11/3476 |
| 2022/0237071 A1* | 7/2022 | Wong | G06F 11/0793 |
| 2022/0408692 A1* | 12/2022 | Silva | G06V 10/32 |
| 2022/0413929 A1* | 12/2022 | Ramasamy | G06F 11/3442 |
| 2024/0211695 A1* | 6/2024 | Srinivasan | G06F 40/30 |

* cited by examiner

LEVERAGING DISTRIBUTED REGISTERS TO MONITOR, TRACK, AND RECOMMEND UTILIZATION OF RESOURCES

BACKGROUND

Conventional systems do not have the capability to securely monitor resource usage and provide recommendations associated with the resource usage. As such, there exists a need for a system that securely monitors, tracks, and recommends resource usage based at least on analysis of historical activity data.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for dynamically securely monitoring, tracking, and recommending utilization of resources. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention gathers one or more input parameters from one or more entity systems, collects activity data from one or more third party systems, analyzes the activity data collected from the one or third party systems, generates one or more recommendations based on the one or more input parameters and analyzing the activity data, wherein the one or more recommendations are associated with one or more activities, estimates resource usage for the one or more recommendations, and allocates resources to the one or more recommendations.

In some embodiments, the present invention monitors and tracks implementation of the one or more activities associated with the one or more recommendations.

In some embodiments, the present invention monitor and track implementation of the one or more activities based on collecting evidence associated with the implementation of the one or more activities from the one or more third party systems, identifying bias associated with the one or more activities based on the evidence gathered from the one or more third party systems, and calculating activity score associated with the one or more activities based on the evidence and the bias.

In some embodiments, the present invention calculates efficiency and outcome value based on the evidence and the activity score.

In some embodiments, the present invention stores the activity score associated with the one or more activities in an activity database.

In some embodiments, the present invention generates one or more reports based on monitoring and tracking the one or more activities.

In some embodiments, the one or more third party systems comprise one or more satellite systems, one or more social networking systems, one or more news media systems, and one or more other entity systems. The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
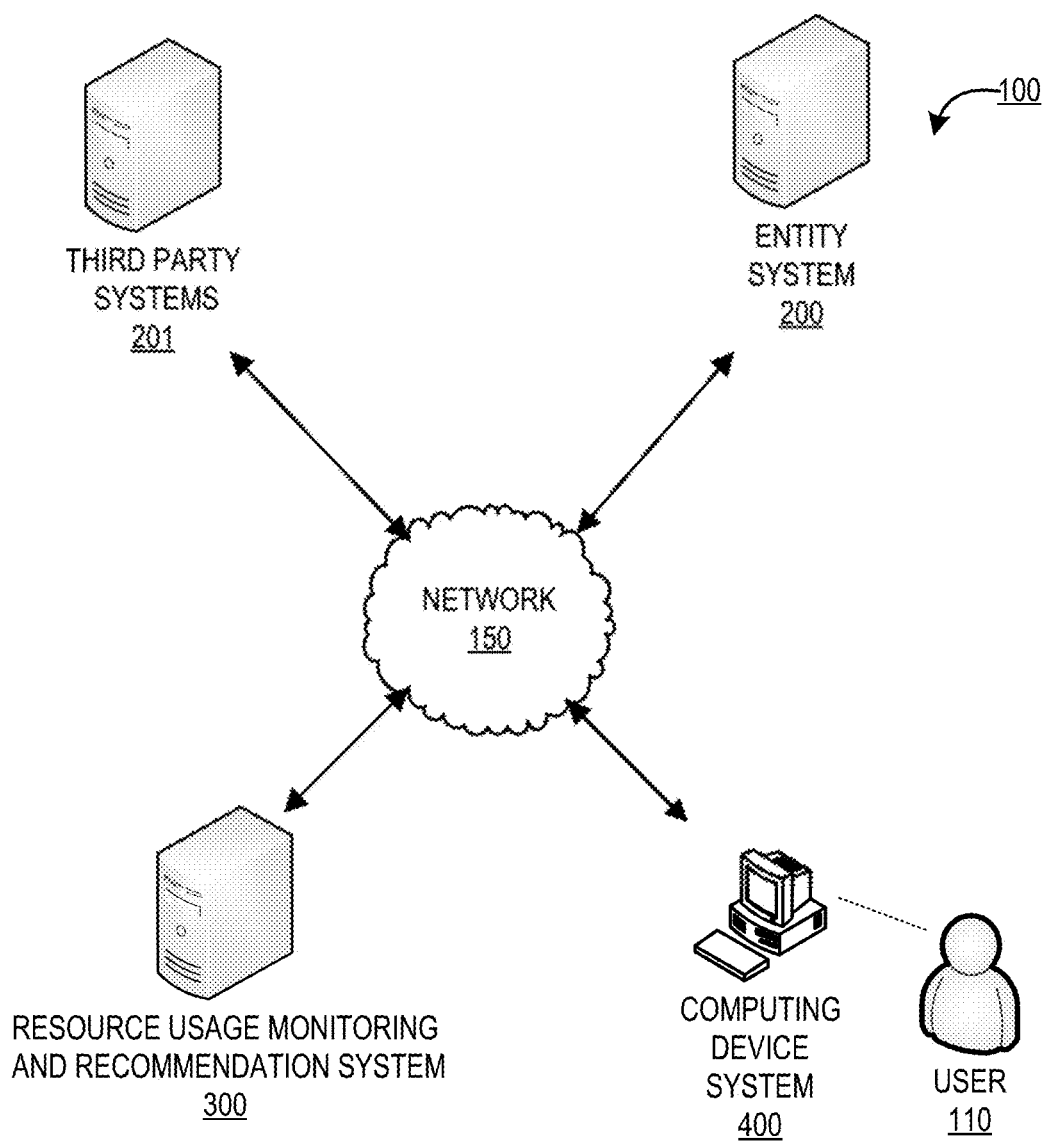
Figure 2:
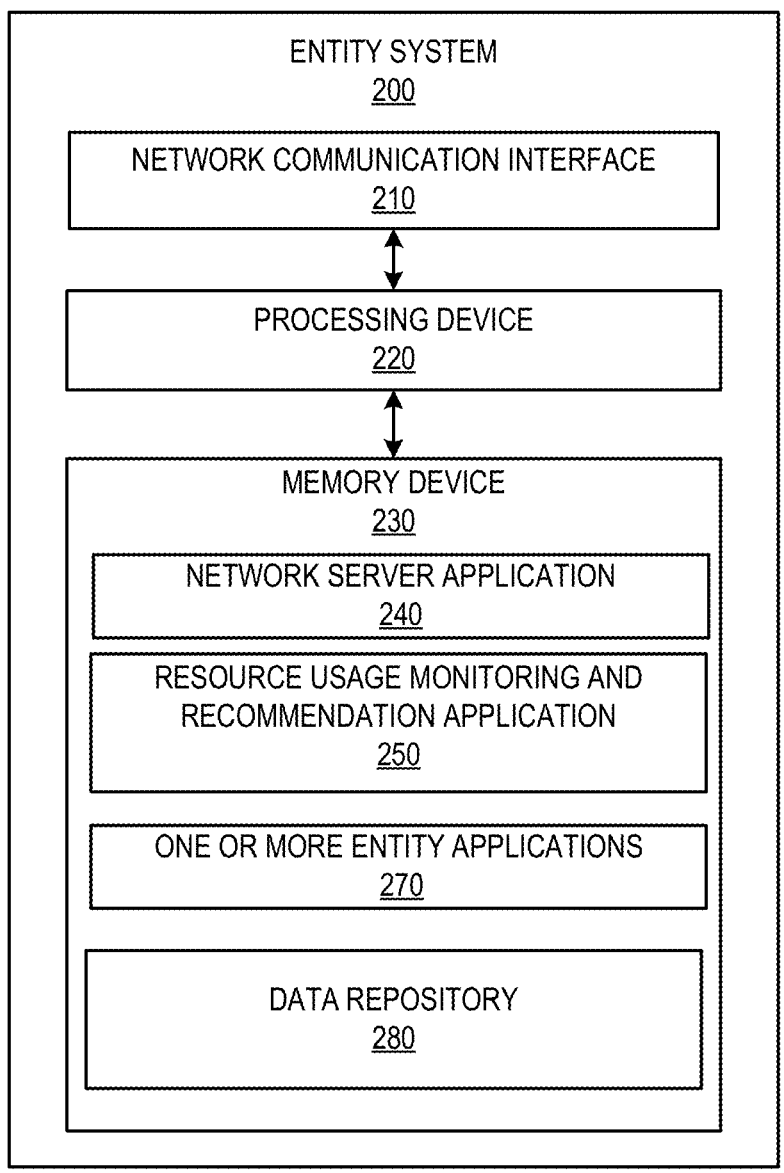
Figure 3:
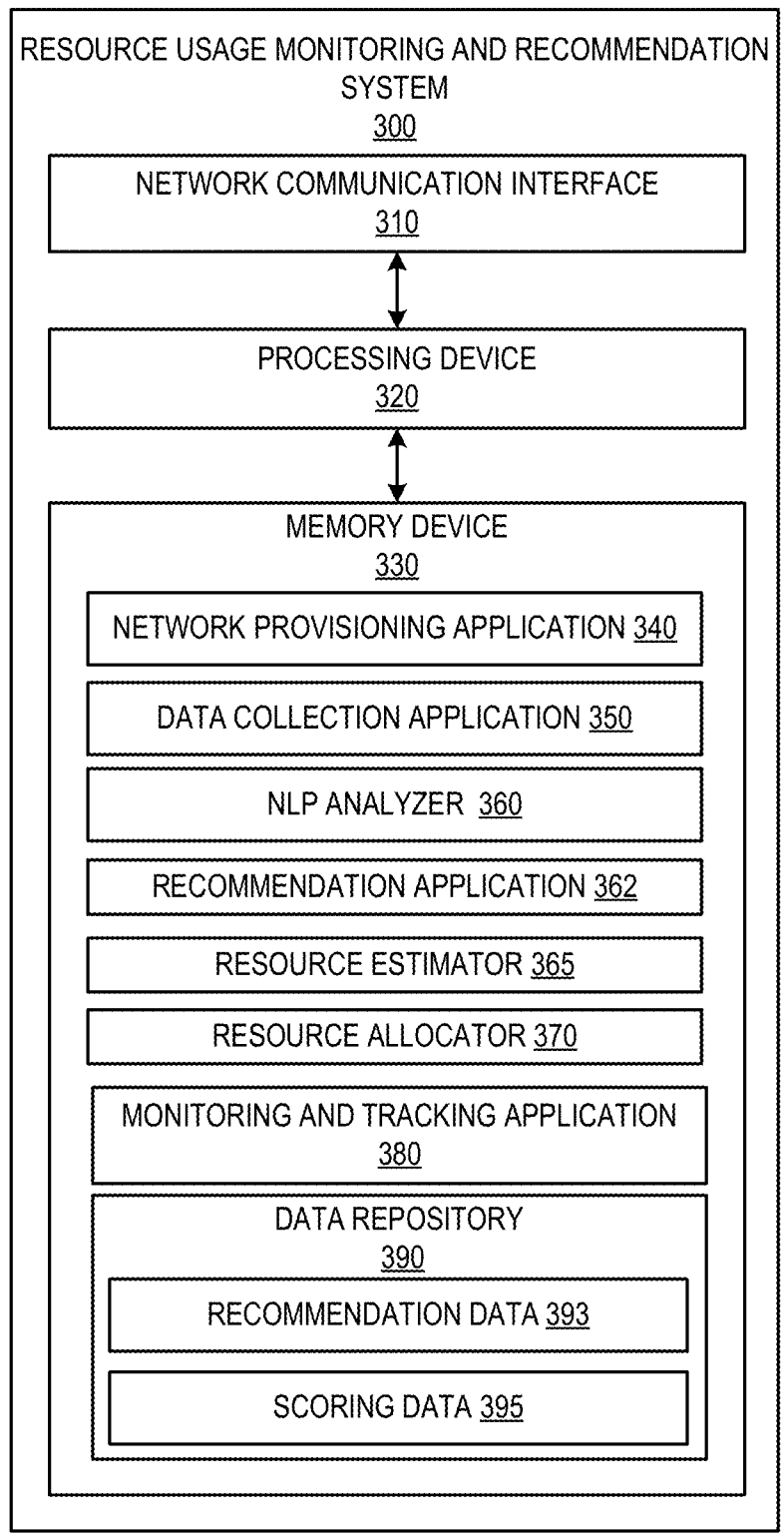
Figure 4:
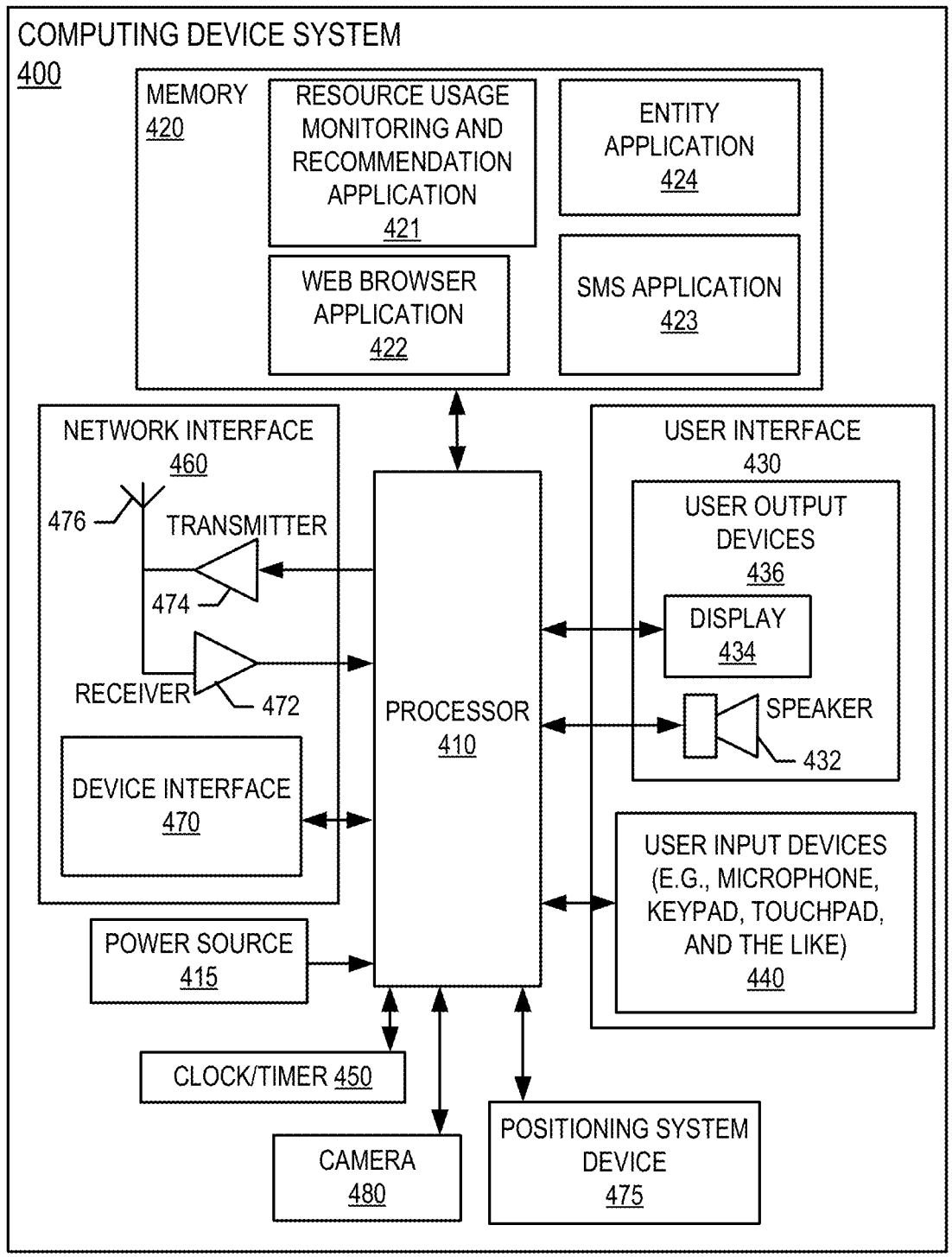
Figure 5:
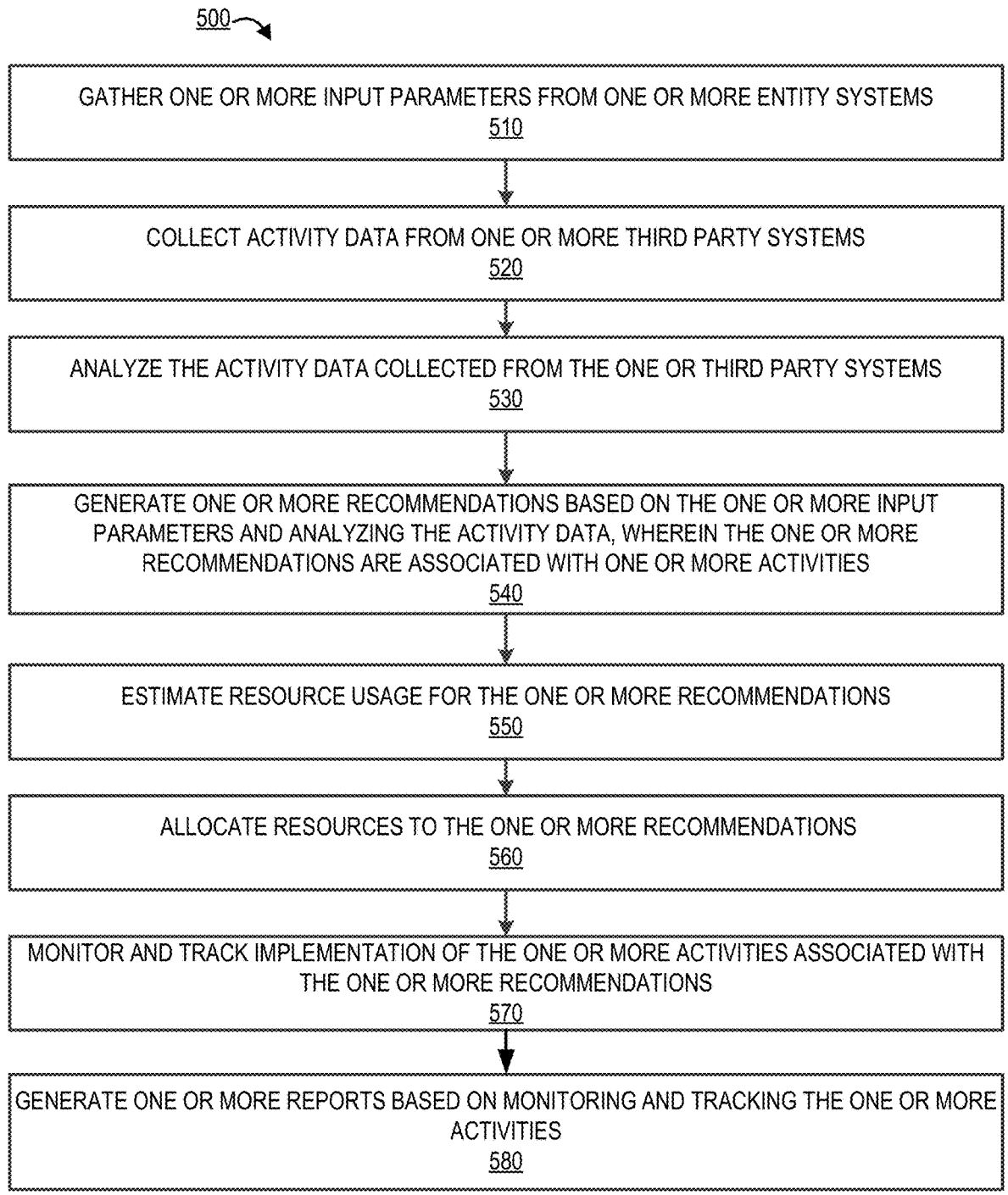
Figure 6:
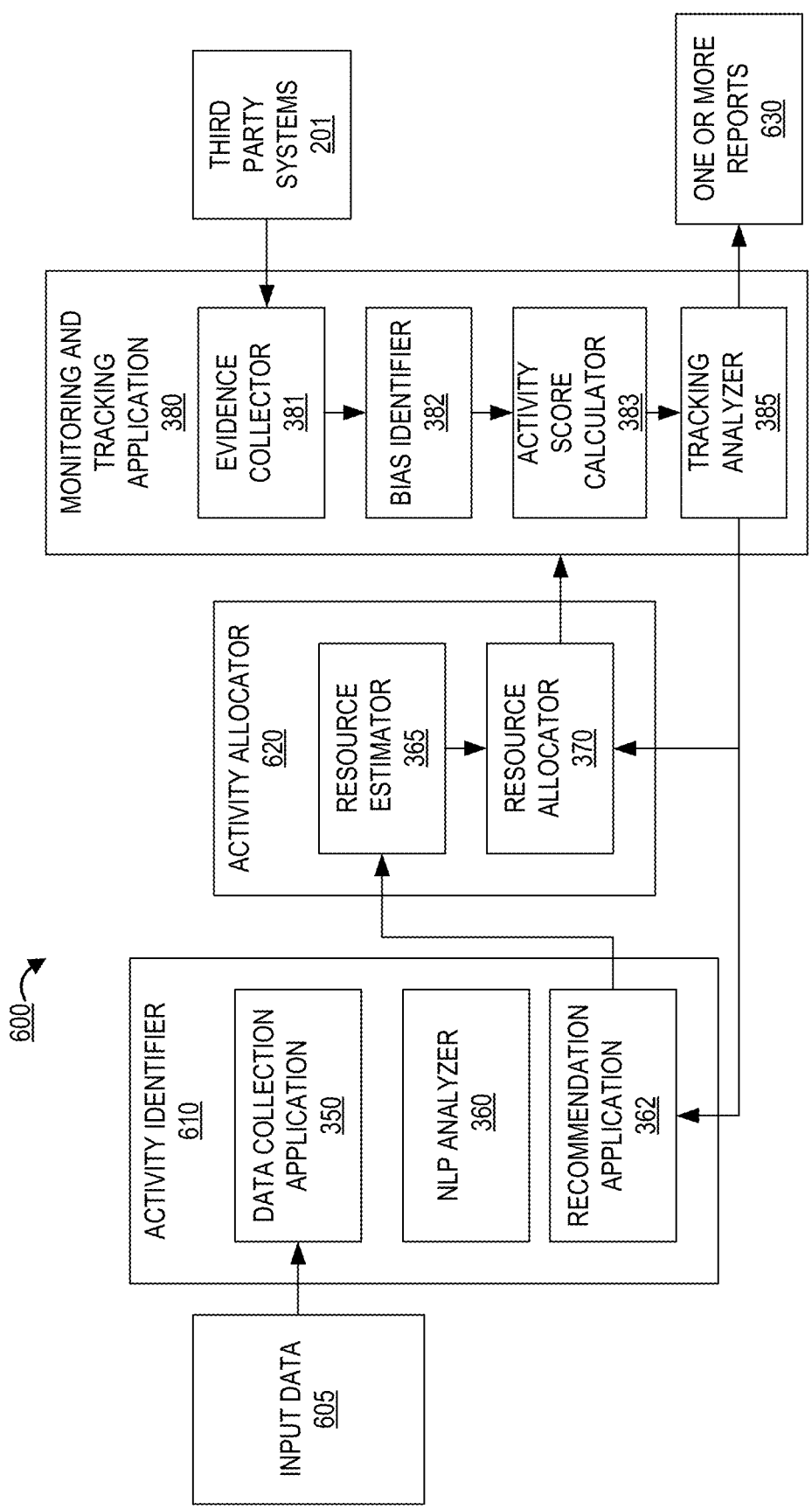

Having thus described embodiments of the invention in general terms, reference will now be made the accompanying drawings, wherein:

FIG. 1 provides a block diagram illustrating a system environment for dynamically securely monitoring, tracking, and recommending utilization of resources, in accordance with an embodiment of the invention;

FIG. 2 provides a block diagram illustrating the entity system 200 of FIG. 1, in accordance with an embodiment of the invention;

FIG. 3 provides a block diagram illustrating a resource usage monitoring and recommendation system 300 of FIG. 1, in accordance with an embodiment of the invention;

FIG. 4 provides a block diagram illustrating the computing device system 400 of FIG. 1, in accordance with an embodiment of the invention;

FIG. 5 provides a process flow for dynamically securely monitoring, tracking, and recommending utilization of resources, in accordance with an embodiment of the invention; and FIG. 6 provides a block diagram illustrating the process flow for dynamically securely monitoring, tracking, and recommending utilization of resources, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that performs one or more organizational activities associated with any sector including, but not limited to, financial sector, or the like. In some embodiments, the entity may be a financial institution which may include herein may include any financial institutions such as commercial banks, thrifts, federal and state savings banks, savings and loan associations, credit unions, investment companies, insurance companies and the like. As described herein, the term "one or more activities" may be Corporate Social Responsibility (CSR) activities such as but not limited to, reducing carbon footprints, improving policies, volunteering activities, charitable giving, fair trade participation, activities that benefit the environment, social and environmentally conscious investments, or the like. In some embodiments, an entity may be any organization that participates in Corporate Social Responsibility (CSR) activities.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, corporate social responsibility activities performed by an entity are not monitored or tracked, thereby resulting in lack of transparency and decreasing the effect of the corporate social responsibility activities. In some cases, lack of tracking and monitoring may result in misuse of entity resources. Therefore, there is a need for a system that securely and dynamically monitors, tracks, and recommends corporate social responsibility activities. The system of the present invention dynamically recommends one or more activities based on performing analysis of historical activity data and also by gathering data from one or more third party systems, thereby ensuring that the recommended activities are not biased. The system utilizes the data collected from the one or more third party systems to monitor and track the resource usage associated with the one or more activities and the progress of the one or more activities, thereby preventing any misuse of resources. In some embodiments, the system of the present invention leverages distributed register technology to perform the process of monitoring, tracking, and recommending resource usage associated with one or more corporate social responsibility activities, where the distributed ledger technology prevents any tampering with the one or more resources, outcomes or effectiveness of the one or more activities, or the like.

FIG. 1 provides a block diagram illustrating a system environment 100 for dynamically securely monitoring, tracking, and recommending utilization of resources, in accordance with an embodiment of the invention. As illustrated in FIG. 1, the environment 100 includes a resource usage monitoring and recommendation system 300, an entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be employees (e.g., management associates, business analysts, finance agents, managing person, or the like) of an entity associated with the entity system 200.

In some embodiments, at least one or more of the resource usage monitoring and recommendation system 300, the entity system 200, the computing device system 400, and the one or more third party systems 201 may be a part of a distributed register network. "Distributed register," which may also be referred to as a "distributed ledger," as used herein may refer to a structured list of data records that is decentralized and distributed amongst a plurality of computing systems and/or devices. In some embodiments, the distributed ledger may use a linked block structure. "Linked block," "linked block structure," "linked structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, a pointer (e.g., a hash value) to the previous block in the linked block structure, and/or any additional data created by the system of the present invention. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified. A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities. The one or more third party systems 201 may include, but are not limited to, satellite systems, location information systems, social media systems, vendor systems, media systems, or the like, where the one or more third party systems 201 provide information associated with one or more activities associated with the entity.

The resource usage monitoring and recommendation system 300 is a system of the present invention for performing one or more process steps described herein. In some embodiments, the resource usage monitoring and recommendation system 300 may be an independent system. In some embodiments, the resource usage monitoring and recommendation system 300 may be a part of the entity system 200.

The resource usage monitoring and recommendation system 300, the entity system 200, the computing device system 400, and the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the resource usage monitoring and recommendation system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the resource usage monitoring and recommendation system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a resource usage monitoring and recommendation application 250, one or more entity applications 270, and a data repository 280 comprising historical activity data associated with the entity and data accessed, retrieved, and/or computed by the entity system 200. The one or more entity applications 270 may be any applications developed, supported, maintained, utilized, and/or controlled by the entity. The computer-executable program code of the network server application 240, the resource usage monitoring and recommendation application 250, the one or more entity application 270 to perform certain logic, data-extraction, and data-storing functions of the entity system 200 described herein, as well as communication functions of the entity system 200.

The network server application 240, the resource usage monitoring and recommendation application 250, and the one or more entity applications 270 are configured to store data in the data repository 280 or to use the data stored in the data repository 280 when communicating through the network communication interface 210 with the resource usage monitoring and recommendation system 300, and/or the computing device system 400 to perform one or more process steps described herein. In some embodiments, the entity system 200 may receive instructions from the resource usage monitoring and recommendation system 300 via the resource usage monitoring and recommendation application 250 to perform certain operations. The resource usage monitoring and recommendation application 250 may be provided by the resource usage monitoring and recommendation system 300. The one or more entity applications 270 may be any of the applications used, created, modified, facilitated, and/or managed by the entity system 200.

FIG. 3 provides a block diagram illustrating the resource usage monitoring and recommendation system 300 in greater detail, in accordance with embodiments of the invention. As illustrated in FIG. 3, in one embodiment of the invention, the resource usage monitoring and recommendation system 300 includes one or more processing devices 320 operatively coupled to a network communication interface 310 and a memory device 330. In certain embodiments, the resource usage monitoring and recommendation system 300 is operated by an entity, such as a financial institution. In some embodiments, the resource usage monitoring and recommendation system 300 is owned or operated by the entity of the entity system 200. In some embodiments, the resource usage monitoring and recommendation system 300 may be an independent system. In alternate embodiments, the resource usage monitoring and recommendation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the resource usage monitoring and recommendation system 300 described herein. For example, in one embodiment of the resource usage monitoring and recommendation system 300, the memory device 330 includes, but is not limited to, a network provisioning application 340, a data collection application 350, an NLP analyzer 360, a recommendation application 362, a resource estimator 365, a resource allocator 370, a monitoring and tracking application 380, and a data repository 390 comprising recommendation data 393, scoring data 395, and any other data processed or accessed by one or more applications in the memory device 330. In some embodiments, the functions of the monitoring and tracking application 380 may be implemented on a distributed register network as discussed in FIG. 6 below. The computer-executable program code of the network provisioning application 340, the data collection application 350, the NLP analyzer 360, the recommendation application 362, the resource estimator 365, the resource allocator 370, and the monitoring and tracking application 380 may instruct the processing device 320 to perform certain logic, data-processing, and data-storing functions of the resource usage monitoring and recommendation system 300 described herein, as well as communication functions of the resource usage monitoring and recommendation system 300.

The network provisioning application 340, the data collection application 350, the NLP analyzer 360, the recommendation application 362, the resource estimator 365, the resource allocator 370, and the monitoring and tracking application 380 are configured to invoke or use the data in the data repository 390 when communicating through the network communication interface 310 with the entity system 200, and/or the computing device system 400. In some embodiments, the network provisioning application 340, the data collection application 350, the NLP analyzer 360, the recommendation application 362, the resource estimator 365, the resource allocator 370, and the monitoring and tracking application 380 may store the data extracted or received from the entity system 200, and the computing device system 400 in the data repository 390. In some embodiments, the network provisioning application 340, the data collection application 350, the NLP analyzer 360, the recommendation application 362, the resource estimator 365, the resource allocator 370, and the monitoring and tracking application 380 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable.

The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a resource usage monitoring and recommendation application 421, entity application 424. These applications also typically instructions to a graphical user interface (GUI) on the display 430 that allows the user 110 to interact with the entity system 200, the resource usage monitoring and recommendation system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the resource usage monitoring and recommendation application 421 provided by the resource usage monitoring and recommendation system 300 allows the user 110 to access the resource usage monitoring and recommendation system 300. In some embodiments, the entity application 424 provided by the entity system 200 and the resource usage monitoring and recommendation application 421 allow the user 110 to access the functionalities provided by the resource usage monitoring and recommendation system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart 500 illustrating a process flow for dynamically securely monitoring, tracking, and recommending utilization of resources, in accordance with an embodiment of the invention. In some embodiments, one or more steps of the process flow 500 may be implemented on a distributed register network to make the process more secure and to avoid any tampering or biasness associated with the utilization of resources. As shown in block 510, the system gathers one or more input parameters from one or more entity systems. The one or more input parameters may comprise at least one or more strategies and one or more brand values associated with the entity.

As shown in block 520, the system collects activity data from one or more third party systems. The one or more third party entity systems may comprise one or more satellite systems, one or more social networking systems, one or more news media systems, and one or more other entity systems. The activity data collected the one or more third party systems may comprise at least top trending corporate social responsibility activities, local and/or global issues (e.g., society issues, social issues, or the like), and corporate social responsibility activities of one or more other entities (e.g., competitors, or the like).

As shown in block 530, the system analyzes the activity data collected from the one or third party systems. In some embodiments, the system may perform Natural Language Processing on the activity data collected from the third party systems. In some embodiments, the system may analyze the activity data and determines one or more sentiments associated with the activity data. For example, the system may determine from one or more social media systems and other third party systems that an event (e.g., forest fire, literacy rate, or the like) is gaining sympathy among different users.

As shown in block 540, the system generates one or more recommendations based on the one or more input parameters and analyzing the activity data, wherein the one or more recommendations are associated with one or more activities. In some embodiments, the one or more recommendations may be based on historical data stored in an activity database. In some embodiments, the system may employ an artificial intelligence engine to generate the one or more recommendations. The one or more recommendations may be associated with one or more corporate social responsibility activities, where these activities may be generated based on the one or more input parameters, the activity data, and the historical data. For example, the system may identify that (i) forest fire event is gaining sympathy among different users, (ii) contributing resources towards such an event also aligns with entity brand values and/or strategies (e.g., environmental goals), and (iii) such historical activities had a high historical success, and may recommend performing one or more activities (e.g., sending physical resources/monetary resources) for such an event.

As shown in block 550, the system estimates resource usage for the one or more recommendations. The system may perform such estimations based on the type of activity, historical data, urgency associated with the event related to the one or more activities, and the like. As shown in block 560, the system allocates resources to the one or more recommendations.

As shown in block 570, the system monitors and tracks implementation of the one or more activities associated with the one or more recommendations. The system may monitor and track the implementation of the one or more activities based on collecting evidence associated with the implementation of the one or more activities from the one or more third party systems. For example, if the activity is associated with planting trees, the system may gather evidence from one or more social networking systems (e.g., based on one or more social media posts), one or more news media systems (e.g., based on news articles), and one or more satellite systems (e.g., satellite images that may show planting of trees), or the like. Monitoring and tracking the implementation of the one or more activities may further comprise identifying bias associated with the one or more activities based on the evidence gathered from the one or more third party systems. The system may identify whether any of the one or more recommendations are biased towards a certain cause, geographic location, user groups, or the like. For example, the system may identify any tampering with the activities based on identifying whether the social responsibility activities that are being performed on entity's behalf are directed towards a certain geographical location, or the like. In an embodiment, where at least one activity of the one or more activities is identified to be biased, the at least one activity is reassessed or abandoned.

The system then calculates activity score associated with the one or more activities based on the evidence and the bias. For example, the system may identify that tree planting activity performed on entity behalf has been fulfilled and is not associated with any bias and may assign a high activity score for the tree planting activity. In some embodiments, the system may calculate the activity score based on the sentiment associated with the activity. For example, the system may identify based on social media networking systems, that different user groups are appreciating tree planting activity and may increase the activity score associated with the activity. In some embodiments, the system may store the activity score and other information (e.g., progress, effective implementation, impact, outcome, or the like) associated with the one or more activities in the activity database. In some embodiments, the system may utilize the activity score and the other information stored in the activity database for generating future recommendations and for determining whether additional resources are required to fulfill and/or maintain the one or more activities. In some embodiments, the system may calculate efficiency, time taken to complete the one or more activities, and value associated with the outcomes based on monitoring and tracking the one or more activities.

As shown in block 580, the system generates one or more reports based on monitoring and tracking the one or more activities. The one or more reports generated by the system may be utilized for audit, accounting, or the like. In some embodiments, the one or more reports may comprise at least activity score, efficiency, time, and outcome value calculated by the system as discussed above. The system may determine based on the one or more reports whether additional resources are required for performing the one or more activities in the future. In some embodiments, process flow 500 may be implemented on a distributed register network to avoid any tampering or bias associated with one or more activities. In some specific embodiments, process flow described in block 570 is implemented on a distributed register network.

FIG. 6 provides a block diagram illustrating the process flow for dynamically securely monitoring, tracking, and recommending utilization of resources, in accordance with an embodiment of the invention. As shown the system gathers input data 605 from the entity systems 200 and/or the third party systems 201. The input data may comprise one or more input parameters and activity data. As shown, the activity identifier 610 of the system comprising data collection application 350, NLP analyzer 360, and recommendation application 632 collect the input data 605, analyze the input data 605, and generate one or more recommendations respectively. The one or more recommendations are then passed onto the activity allocator 620 comprising resource estimator 365 and resource allocator 370, where resources are estimated and allocated for each of the one or more recommendations. After the resources are allocated for the one or more recommendations, the monitoring and tracking application 380 monitors and tracks the implementation of the one or more activities associated with the one or more recommendations. In some embodiments, the monitoring and tracking application 380 may be implemented on a closed distributed register network such that the processing of the monitoring and tracking application 380 is secure and cannot be tampered with. The monitoring and tracking application 380 may further comprise an evidence collector 381 for collecting evidence from one or more third party systems 201, a bias identifier 382 for identifying bias, an activity score calculator 383 for calculating activity scores associated with the one or more activities, and a tracking analyzer 385 for calculating time, efficiency, and outcome value associated with the each of the one or more activities. In some embodiments, the tracking analyzer 385 may generate one or more reports and may pass the information to resource allocator 370 for identifying if additional resources are required for the one or more activities. The tracking analyzer 385 may also pass on the information to the recommendation application 362 that may be used for future recommendations. The activity identifier 610 and the activity allocator 620 may be implemented by an artificial intelligence engine.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for securely monitoring, tracking, and recommending utilization of resources, the system comprising:
at least one network communication interface;
at least one non-transitory storage device; and
at least one processor coupled to the at least one non-transitory storage device and the at least one network communication interface, wherein the at least one processor is configured to:
gather one or more input parameters from one or more entity systems;
establish a communication with the one or more third party systems to collect activity data from the one or more third party systems, wherein the one or more third party systems comprise satellite systems;
analyze the activity data collected from the one or third party systems;
generate one or more recommendations based on the one or more input parameters and analyzing the activity data, wherein the one or more recommendations are associated with one or more activities;
estimate resource usage to implement the one or more activities;
allocate resources to the one or more activities;
implement the one or more activities using the allocated resources; and
monitor and track implementation of the one or more activities associated with the one or more recommendations, via a distributed register network, based on:
collecting evidence associated with the implementation of the one or more activities from the one or more third party systems;
identifying bias associated with the one or more activities based on the evidence gathered from the one or more third party systems; and
calculating activity score associated with the one or more activities based on the evidence and the bias.

2. The system of claim 1, wherein the at least one processor is configured to calculate efficiency and outcome value based on the evidence and the activity score.

3. The system of claim 1, wherein the distributed register network is a closed distributed register network.

4. The system of claim 1, wherein the at least one processor is configured to generate one or more reports based on monitoring and tracking the one or more activities.

5. The system of claim 1, wherein the one or more third party systems further comprise one or more social networking systems, one or more news media systems, vendor systems, media systems, location information systems, and one or more other entity systems.

6. The system of claim 1, wherein the one or more input parameters may comprise at least one of one or more strategies and one or more brand values associated with the entity.

7. The system of claim 1, wherein the at least one processor is configured to analyze the activity data collected from the one or third party systems, via Natural Language Processing (NLP) models.

8. A computer program product for securely monitoring, tracking, and recommending utilization of resources, the computer program product comprising a non-transitory computer-readable storage medium having computer executable instructions for causing a computer processor to perform the steps of:
gathering one or more input parameters from one or more entity systems;
establishing a communication with the one or more third party systems for collecting activity data from the one or third party systems, wherein the one or more third party systems comprise satellite systems;

analyzing the activity data collected from the one or third party systems;
generating one or more recommendations based on the one or more input parameters and analyzing the activity data, wherein the one or more recommendations are associated with one or more activities;
estimating resource usage to implement the one or more activities;
allocating resources to the one or more activities;
implement the one or more activities using the allocated resources; and
monitoring and tracking implementation of the one or more activities associated with the one or more recommendations, via a distributed register network, based on:
collecting evidence associated with the implementation of the one or more activities from the one or more third party systems;
identifying bias associated with the one or more activities based on the evidence gathered from the one or more third party systems; and
calculating activity score associated with the one or more activities based on the evidence and the bias.

9. The computer program product of claim 8, wherein the computer executable instructions cause the computer processor to perform the step of calculating efficiency and outcome value based on the evidence and the activity score.

10. The computer program product of claim 8, wherein the distributed register network is a closed distributed register network.

11. The computer program product of claim 8, wherein the computer executable instructions cause the computer processor to perform the step of generating one or more reports based on monitoring and tracking the one or more activities.

12. The computer program product of claim 8, the one or more third party systems further comprise one or more social networking systems, one or more news media systems, vendor systems, media systems, location information systems, and one or more other entity systems.

13. The computer program product of claim 8, wherein the one or more input parameters may comprise at least one of one or more strategies and one or more brand values associated with the entity.

14. A computer implemented method for securely monitoring, tracking, and recommending utilization of resources, wherein the method comprises:
gathering one or more input parameters from one or more entity systems;
establishing a communication with the one or more third party systems for collecting activity data from the one or more third party systems, wherein the one or more third party systems comprise satellite systems;
analyzing the activity data collected from the one or third party systems;
generating one or more recommendations based on the one or more input parameters and analyzing the activity data, wherein the one or more recommendations are associated with one or more activities;
estimating resource usage to implement the one or more activities;
allocating resources to the one or more activities;
implementing the one or more activities using the allocated resources; and
monitoring and tracking implementation of the one or more activities associated with the one or more recommendations, via a distributed register network, based on:
collecting evidence associated with the implementation of the one or more activities from the one or more third party systems;
identifying bias associated with the one or more activities based on the evidence gathered from the one or more third party systems; and
calculating activity score associated with the one or more activities based on the evidence and the bias.

15. The computer implemented method of claim 14, wherein the method further comprises calculating efficiency and outcome value based on the evidence and the activity score.

16. The computer implemented method of claim 14, wherein the distributed register network is a closed distributed register network.

17. The computer implemented method of claim 14, wherein the method further comprises generating one or more reports based on monitoring and tracking the one or more activities.

18. The computer implemented method of claim 14, wherein the one or more third party systems further comprise one or more social networking systems, one or more news media systems, vendor systems, media systems, location information systems, and one or more other entity systems.

19. The computer implemented method of claim 14, wherein the method comprises analyzing the activity data collected from the one or third party systems, via Natural Language Processing (NLP) models.

20. The computer implemented method of claim 14, wherein the one or more input parameters may comprise at least one of one or more strategies and one or more brand values associated with the entity.

* * * * *